US012391041B2

(12) United States Patent
Mizusaki

(10) Patent No.: US 12,391,041 B2
(45) Date of Patent: Aug. 19, 2025

(54) INKJET PRINTER

(71) Applicant: MIMAKI ENGINEERING CO., LTD., Nagano (JP)

(72) Inventor: Akihiko Mizusaki, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 172 days.

(21) Appl. No.: 18/273,028

(22) PCT Filed: Jan. 7, 2022

(86) PCT No.: PCT/JP2022/000291
§ 371 (c)(1),
(2) Date: Jul. 18, 2023

(87) PCT Pub. No.: WO2022/158308
PCT Pub. Date: Jul. 28, 2022

(65) Prior Publication Data

US 2024/0059061 A1 Feb. 22, 2024

(30) Foreign Application Priority Data

Jan. 20, 2021 (JP) ................................ 2021-007259

(51) Int. Cl.
*B41J 25/316* (2006.01)
*B41J 2/135* (2006.01)
*B41J 19/14* (2006.01)

(52) U.S. Cl.
CPC ............ *B41J 2/135* (2013.01); *B41J 25/316* (2013.01); *B41J 19/142* (2013.01)

(58) Field of Classification Search
CPC ......... B41J 2/135; B41J 25/316; B41J 19/142
See application file for complete search history.

(56) References Cited

U.S. PATENT DOCUMENTS

2007/0091139 A1* 4/2007 Takatsuka ............ B41J 2/16511 347/29
2018/0339509 A1* 11/2018 Momose ............. B41J 2/04508

FOREIGN PATENT DOCUMENTS

JP 2006026990 2/2006
JP 2009297903 A * 12/2009 ................ B41J 2/01
JP 2013119216 6/2013

OTHER PUBLICATIONS

"Office Action of Japan Counterpart Application", issued on Feb. 8, 2024, with English translation thereof, p. 1-p. 7.

(Continued)

*Primary Examiner* — Yaovi M Ameh
(74) *Attorney, Agent, or Firm* — JCIPRNET

(57) ABSTRACT

Provided is an inkjet printer capable of suppressing variations in landing positions of inks ejected from a plurality of inkjet heads mounted on a carriage for each inkjet head. In this inkjet printer, a plurality of inkjet heads 3 are mounted on a carriage. This inkjet printer includes at least one of a first inclination adjustment mechanism (13) for adjusting the inclination of each of the inkjet heads (3) with respect to the carriage in a pivoting direction having a sub scanning direction as an axial direction of pivoting, and a second inclination adjustment mechanism (14) for adjusting the inclination of each of the inkjet heads (3) with respect to the carriage in a pivoting direction having a main scanning direction as an axial direction of pivoting.

2 Claims, 10 Drawing Sheets

(56) References Cited

OTHER PUBLICATIONS

"International Search Report (Form PCT/ISA/210) of PCT/JP2022/000291", mailed on Feb. 8, 2022, with English translation thereof, pp. 1-4.

* cited by examiner

INKJET PRINTER

CROSS-REFERENCE TO RELATED APPLICATION

This application is a 371 application of the International PCT application serial no. PCT/JP2022/000291, filed on Jan. 7, 2022, which claims the priority benefits of Japan Patent Application No. 2021-007259, filed on Jan. 20, 2021. The entirety of each of the above-mentioned patent applications is hereby incorporated by reference herein and made a part of this specification.

TECHNICAL FIELD

The present invention relates to an inkjet printer that performs printing by ejecting ink.

BACKGROUND ART

Conventionally, an inkjet printer (inkjet apparatus) that performs printing by ejecting ink onto a medium is known (see e.g., Patent Literature 1). The inkjet printer described in Patent Literature 1 includes a plurality of inkjet heads that eject ink toward a medium, a carriage on which the plurality of inkjet heads are mounted, and a guide mechanism for moving the carriage in a main scanning direction. The carriage includes a rear surface portion forming a rear surface of the carriage, a bottom surface portion forming a bottom surface of the carriage, and two side surface portions forming side surfaces of the carriage in the main scanning direction. The rear surface portion is fixed to a portion driven by the guide mechanism. A plurality of inkjet printers are mounted on the bottom surface portion.

In the inkjet printer described in Patent Literature 1, the carriage includes a bottom surface height position adjustment unit for adjusting the inclination of the bottom surface portion in a pivoting direction in which a sub scanning direction orthogonal to the main scanning direction and the up-down direction is an axial direction of pivoting, and a θ angle adjustment unit for adjusting the inclination of the bottom surface portion in the pivoting direction in which the main scanning direction is the axial direction of pivoting. Therefore, in this inkjet printer, the inclination in the pivoting direction having the sub scanning direction as the axial direction of pivoting and the inclination in the pivoting direction having the main scanning direction as the axial direction of pivoting of the plurality of inkjet heads mounted on the carriage can be collectively adjusted.

CITATION LIST

Patent Literature

Patent Literature 1: Japanese Unexamined Patent Publication No. 2013-119216

SUMMARY OF INVENTION

Technical Problems

However, in the inkjet printer described in Patent Literature 1, even if the inclination in the pivoting direction having the sub scanning direction as the axial direction of pivoting of the plurality of inkjet heads mounted on the carriage varies for each inkjet head, the inclination of the plurality of inkjet heads in the pivoting direction having the sub scanning direction as the axial direction of pivoting cannot be adjusted for each inkjet head. Furthermore, in this inkjet printer, even if the inclination in the pivoting direction having the main scanning direction as the axial direction of pivoting of the plurality of inkjet heads mounted on the carriage varies for each inkjet head, the inclination in the pivoting direction having the main scanning direction as the axial direction of pivoting of the plurality of inkjet heads cannot be adjusted for each inkjet head.

Therefore, in the inkjet printer described in Patent Literature 1, if the inclination in the pivoting direction having the sub scanning direction as the axial direction of pivoting of the plurality of inkjet heads mounted on the carriage varies for each inkjet head, or the inclination in the pivoting direction having the main scanning direction as the axial direction of pivoting of the plurality of inkjet heads mounted on the carriage varies for each inkjet head, the landing position of the ink (ink droplet) ejected from the inkjet head and landing on the print medium may greatly vary depending on the inkjet head. Furthermore, if the landing position of the ink landing on the print medium greatly varies depending on the inkjet head, the print quality of the print medium degrades.

Therefore, the present invention provides an inkjet printer capable of suppressing a variation in landing positions of ink ejected from a plurality of inkjet heads mounted on a carriage for each inkjet head.

Solutions to Problems

In order to solve the above problems, an inkjet printer of the present invention includes a plurality of inkjet heads that eject ink, a carriage on which the plurality of inkjet heads are mounted, and a carriage drive mechanism that moves the carriage in a main scanning direction; the inkjet printer further including at least one of a first inclination adjustment mechanism for adjusting inclination of each of the inkjet heads with respect to the carriage in a pivoting direction having a sub scanning direction orthogonal to an up-down direction and the main scanning direction as an axial direction of pivoting, and a second inclination adjustment mechanism for adjusting inclination of each of the inkjet heads with respect to the carriage in a pivoting direction having the main scanning direction as an axial direction of pivoting.

The inkjet printer of the present invention includes at least one of a first inclination adjustment mechanism for adjusting the inclination of each of the inkjet heads with respect to the carriage in a pivoting direction having a sub scanning direction as an axial direction of pivoting, and a second inclination adjustment mechanism for adjusting the inclination of each of the inkjet heads with respect to the carriage in a pivoting direction having a main scanning direction as an axial direction of pivoting.

Therefore, in the present invention, at least one of the variation in the inclination in the pivoting direction having the sub scanning direction as the axial direction of pivoting of the plurality of inkjet heads mounted on the carriage for each inkjet head and the variation in the inclination in the pivoting direction having the main scanning direction as the axial direction of pivoting of the plurality of inkjet heads mounted on the carriage for each inkjet head can be suppressed. Therefore, in the present invention, the variation in the landing position of the ink ejected from the plurality of inkjet heads mounted on the carriage for each inkjet head can be suppressed.

Note that even if the inclination in the pivoting direction having the sub scanning direction as the axial direction of pivoting of the plurality of inkjet heads mounted on the carriage varies for each inkjet head, or the inclination in the pivoting direction having the main scanning direction as the axial direction of pivoting of the plurality of inkjet heads mounted on the carriage varies for each inkjet head, the variation in the landing position of the ink ejected from the plurality of inkjet heads mounted on the carriage for each inkjet head can be suppressed by adjusting the ink ejection timing for each inkjet head.

However, in this case, for example, when the thickness of the print medium on which printing is performed by the inkjet head is changed, the distance between the upper surface of the print medium and the inkjet head changes, and thus, the ink ejection timing needs to be readjusted for each inkjet head when the thickness of the print medium is changed. On the other hand, in the present invention, even if the thickness of the print medium on which printing is performed is changed, readjustment is not necessary. Furthermore, for example, when the surface of the print medium has irregularities, it becomes difficult to suppress the variation in the landing position of the ink ejected from the plurality of inkjet heads for each inkjet head even if the ink ejection timing is adjusted for each inkjet head, but in the present invention, even if the surface of the print medium has irregularities, the variation in the landing position of the ink ejected from the plurality of inkjet heads for each inkjet head can be suppressed.

In the present invention, the inkjet printer preferably includes a first inclination adjustment mechanism and a second inclination adjustment mechanism. According to such configuration, both the variation in the inclination in the pivoting direction having the sub scanning direction as the axial direction of pivoting of the plurality of inkjet heads mounted on the carriage for each inkjet head and the variation in the inclination in the pivoting direction having the main scanning direction as the axial direction of pivoting of the plurality of inkjet heads mounted on the carriage for each inkjet head can be suppressed. Therefore, the variation in the landing position of the ink ejected from the plurality of inkjet heads mounted on the carriage for each inkjet head can be effectively suppressed.

In the present invention, for example, the first inclination adjustment mechanism includes a head fixing member to which the inkjet head is fixed; the second inclination adjustment mechanism includes a holding member that holds the head fixing member; the holding member is pivotable with respect to the carriage with a main scanning direction as an axial direction of pivoting; and the head fixing member is pivotable with respect to the holding member with a sub scanning direction as an axial direction of pivoting.

In the present invention, for example, the first inclination adjustment mechanism includes a first lever member pivotably held by the holding member, a first spring member that biases the first lever member toward one side in a pivoting direction of the first lever member, and a first micrometer head or a first adjustment screw for pivoting the first lever member toward the other side in the pivoting direction of the first lever member; the second inclination adjustment mechanism includes a second lever member pivotably held by the carriage, a second spring member that biases the second lever member toward one side in a pivoting direction of the second lever member, and a second micrometer head or a second adjustment screw for pivoting the second lever member toward the other side in the pivoting direction of the second lever member; the first lever member is engaged with the head fixing member, and when the first lever member is pivoted, the head fixing member is pivoted with a sub scanning direction as an axial direction of pivoting with respect to the holding member; and the second lever member is engaged with the holding member, and when the second lever member is pivoted, the holding member is pivoted with a main scanning direction as an axial direction of pivoting with respect to the carriage.

In the present invention, the inkjet printer further includes a position adjustment mechanism for adjusting a position in a sub scanning direction of each of the inkjet heads with respect to the carriage, and a third inclination adjustment mechanism for adjusting an inclination of each of the inkjet heads with respect to the carriage in a pivoting direction having an up-down direction as an axial direction of pivoting; where the holding member constitutes a part of the position adjustment mechanism and is movable in the sub scanning direction with respect to the carriage; and the head fixing member constitutes a part of the third inclination adjustment mechanism, and is pivotable with an up-down direction as an axial direction of pivoting with respect to the holding member. According to such configuration, even if the inkjet printer includes the position adjustment mechanism and the third inclination adjustment mechanism in addition to the first inclination adjustment mechanism and the second inclination adjustment mechanism, the configuration of the inkjet printer can be simplified.

Effect of the Invention

As described above, in the inkjet printer of the present invention, the variation in the landing position of the ink ejected from the plurality of inkjet heads mounted on the carriage for each inkjet head can be suppressed.

DESCRIPTION OF EMBODIMENTS

Hereinafter, an embodiment of the present invention will be described with reference to the drawings.

(Schematic Configuration of Inkjet Printer)

Figure 1:
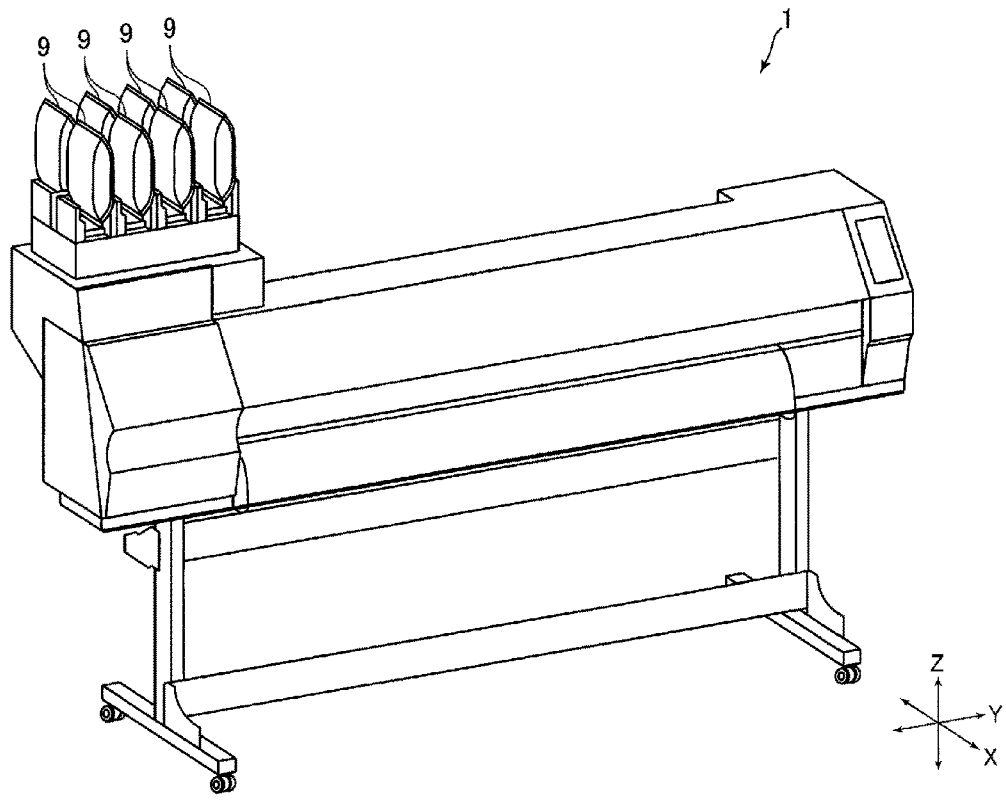
FIG. 1 is a perspective view of an inkjet printer according to an embodiment of the present invention.
Figure 2:
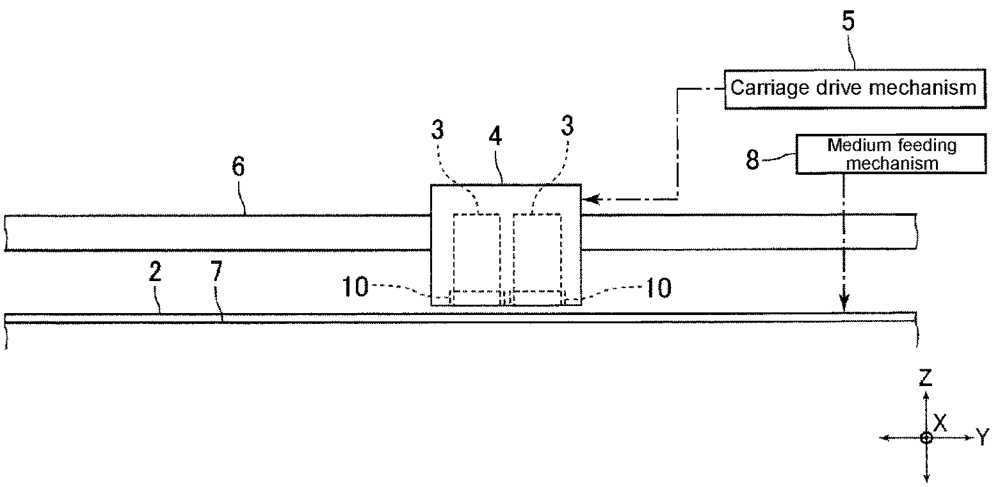
FIG. 2 is a schematic view for describing the configuration of the inkjet printer shown in FIG. 1.

FIG. 1 is a perspective view of an inkjet printer 1 according to an embodiment of the present invention. FIG. 2 is a schematic view for describing the configuration of the inkjet printer 1 illustrated in FIG. 1.

The inkjet printer 1 (hereinafter referred to as "printer 1") of the present embodiment is, for example, a business inkjet printer, and performs printing on a print medium 2. The print medium 2 is, for example, printing paper, fabric, or the like. The printer 1 includes a plurality of inkjet heads 3 (hereinafter referred to as "heads 3") that eject ink toward a print medium 2, and a carriage 4 on which the plurality of heads 3 are mounted. The printer 1 of the present embodiment includes, for example, two heads 3, and the two heads 3 are mounted on the carriage 4.

Furthermore, the printer 1 includes a carriage drive mechanism 5 that moves the carriage 4 in a main scanning direction (Y direction in FIG. 1 etc.), a guide rail 6 for guiding the carriage 4 in the main scanning direction, a platen 7 on which the print medium 2 at the time of printing is placed, a medium feeding mechanism 8 that feeds the print medium 2 in a sub scanning direction (X direction in FIG. 1 etc.) orthogonal to the up-down direction (Z direction in FIG. 1 etc.) and the main scanning direction, and a plurality of ink tanks 9 in which ink to be supplied to the head 3 is stored.

The platen 7 is disposed on the lower side of the head 3. The head 3 ejects ink downward. A nozzle row is formed on a lower surface of the head 3. The nozzle row is configured by a plurality of nozzles arrayed in the sub scanning direction. The carriage drive mechanism 5 includes, for example, two pulleys, a belt that is bridged between the two pulleys and that has a part fixed to the carriage 4, and a motor that rotates the pulleys. The medium feeding mechanism 8 includes, for example, a conveyor roller that comes into contact with the print medium 2 and feeds the print medium 2, and a motor that rotates the conveyor roller.

The printer 1 also includes an adjustment mechanism 10 for adjusting the inclination and position of each of the heads 3 with respect to the carriage 4. The printer 1 of the present embodiment includes two adjustment mechanisms 10 including an adjustment mechanism 10 for adjusting the inclination and position of one head 3 of the two heads 3 mounted on the carriage 4 and an adjustment mechanism 10 for adjusting the inclination and position of the other head 3 of the two heads 3. The two adjustment mechanisms 10 are mounted on the carriage 4. Hereinafter, the configuration of the adjustment mechanism 10 will be described.

(Configuration of Adjustment Mechanism)

Figure 3:
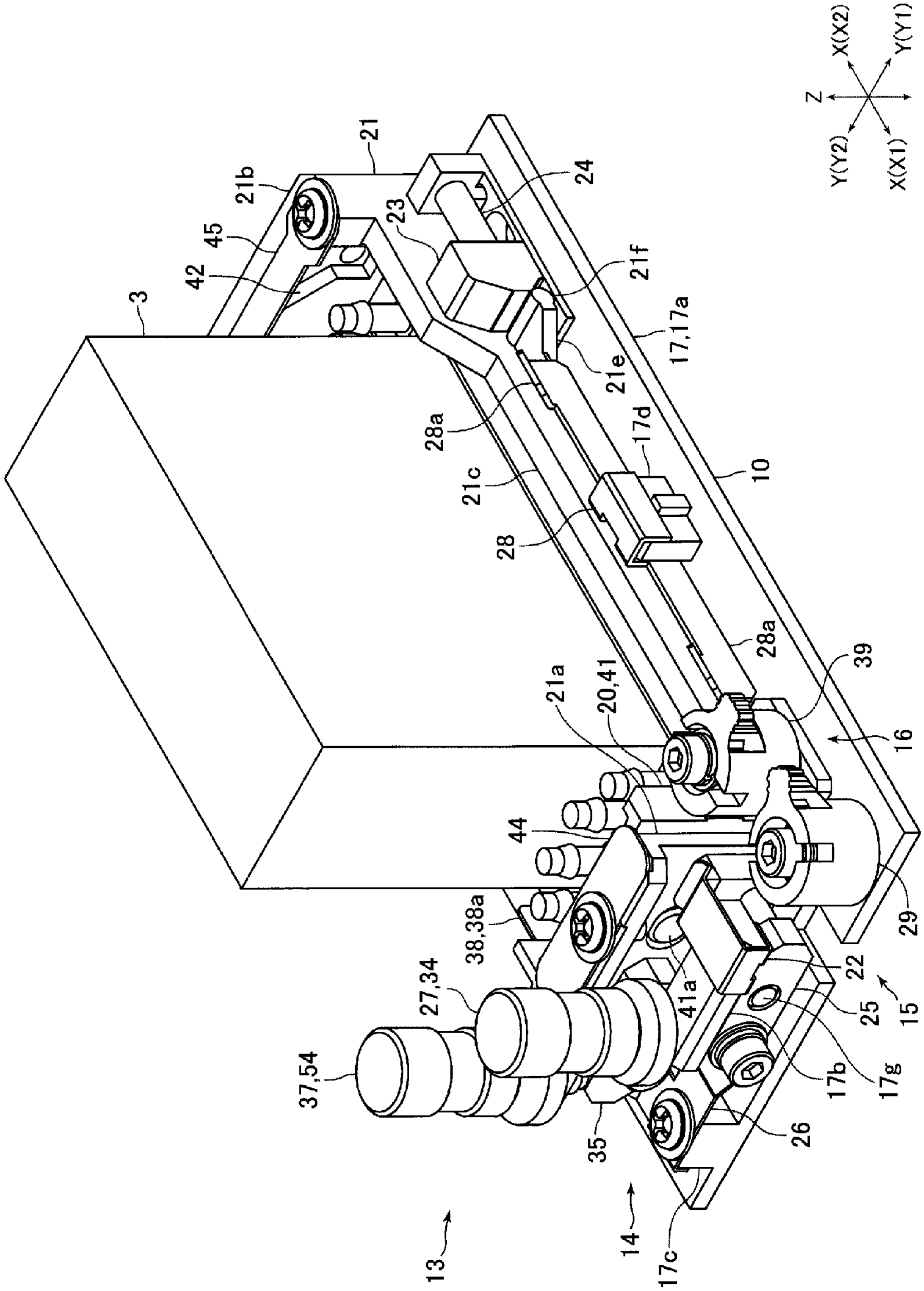
FIG. 3 is a perspective view of an inkjet head and an adjustment mechanism illustrated in FIG. 2.
Figure 4:
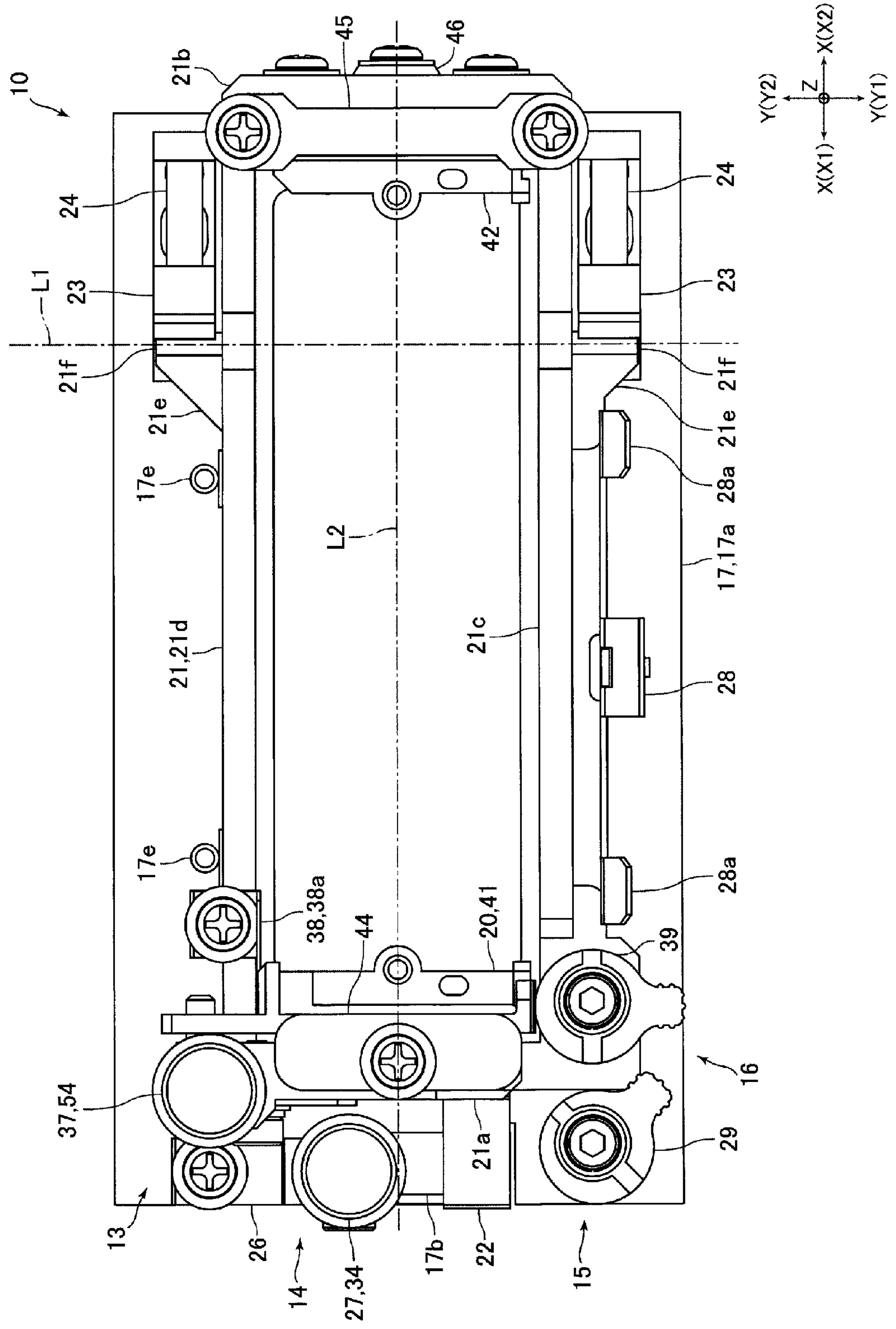
FIG. 4 is a plan view of the adjustment mechanism illustrated in FIG. 3.
Figure 5:
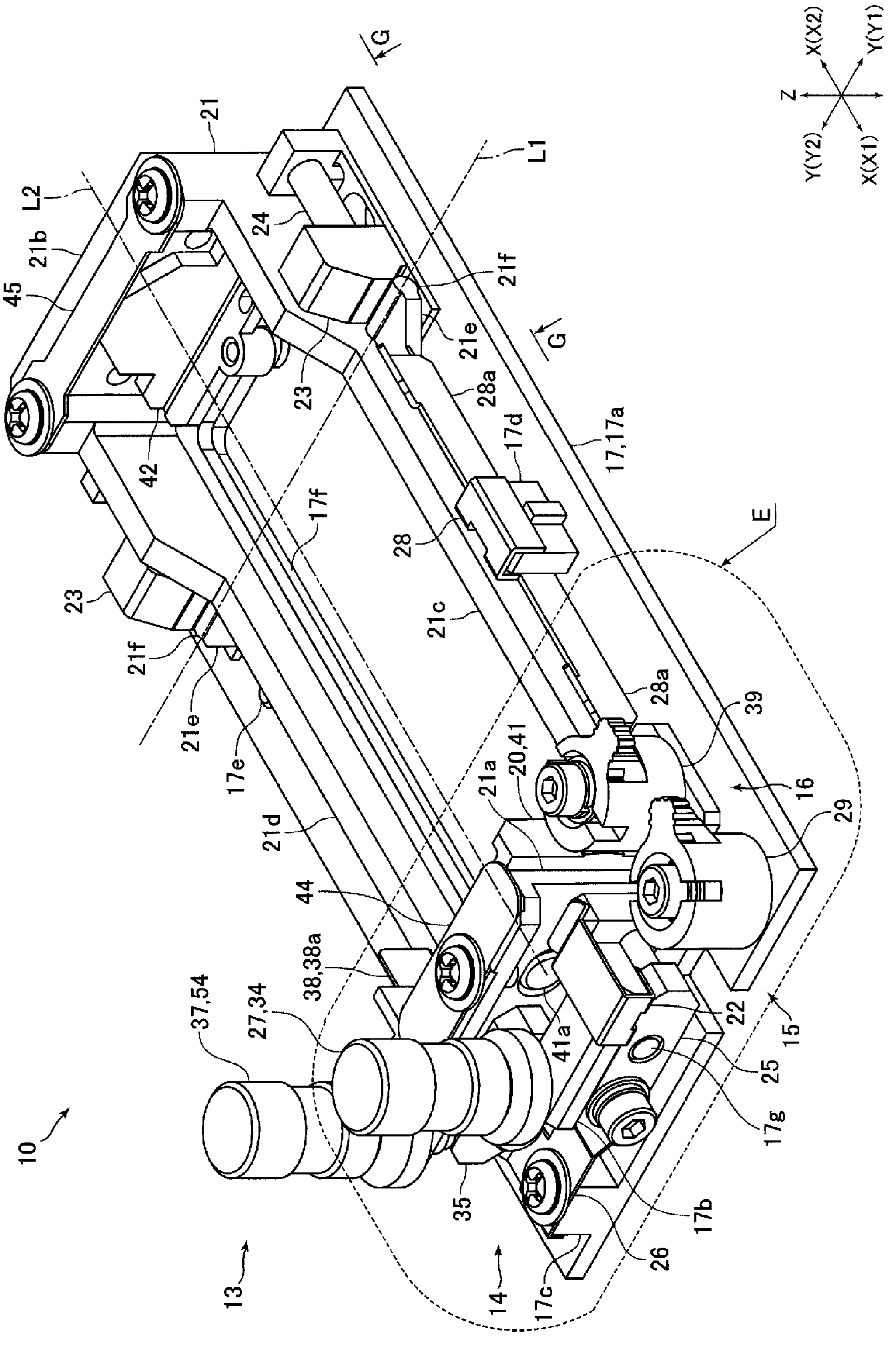
FIG. 5 is a perspective view of the adjustment mechanism illustrated in FIG. 3.
Figure 6:
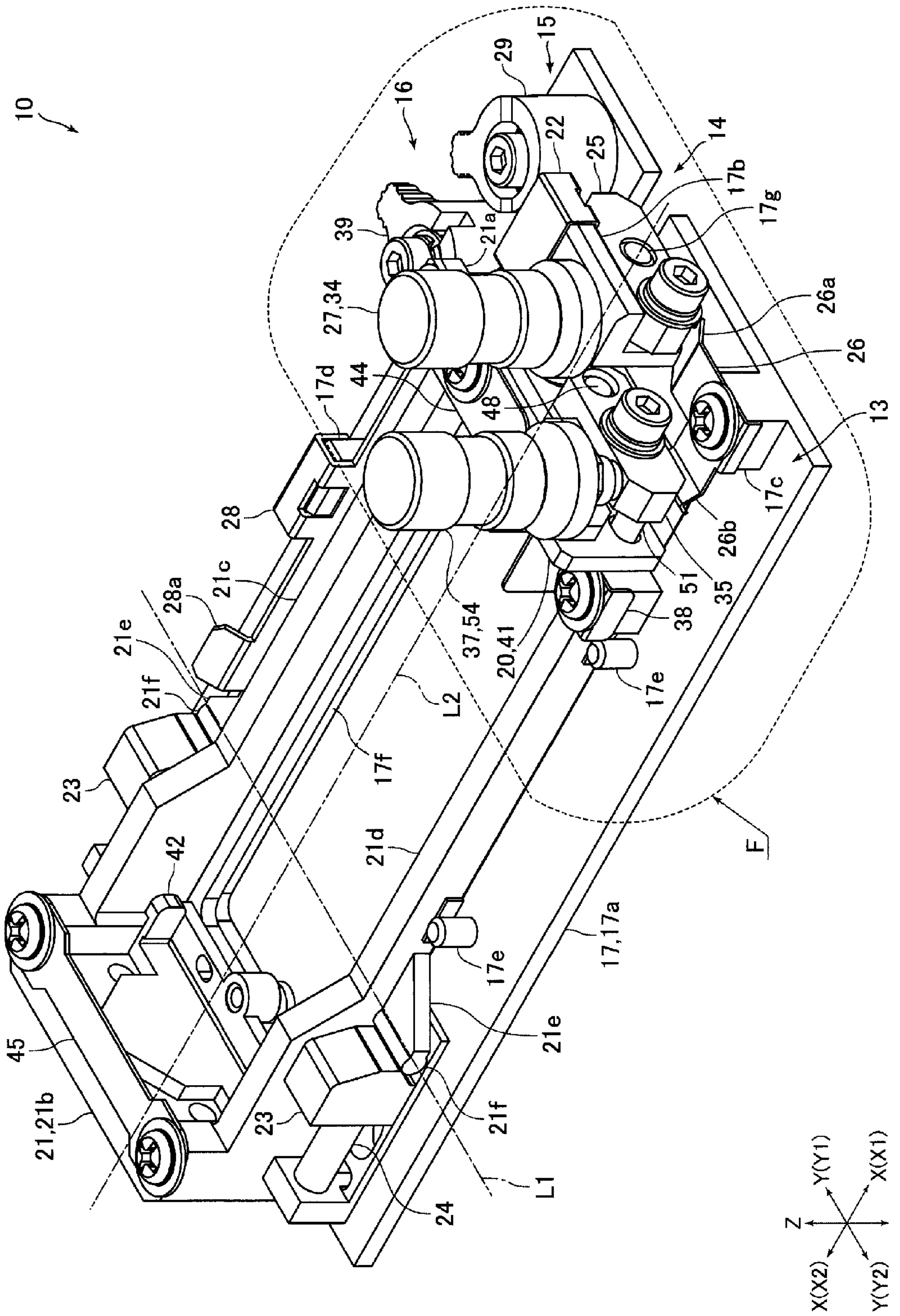
FIG. 6 is a perspective view illustrating the adjustment mechanism illustrated in FIG. 3 from a direction different from that in FIG. 5.
Figure 7:
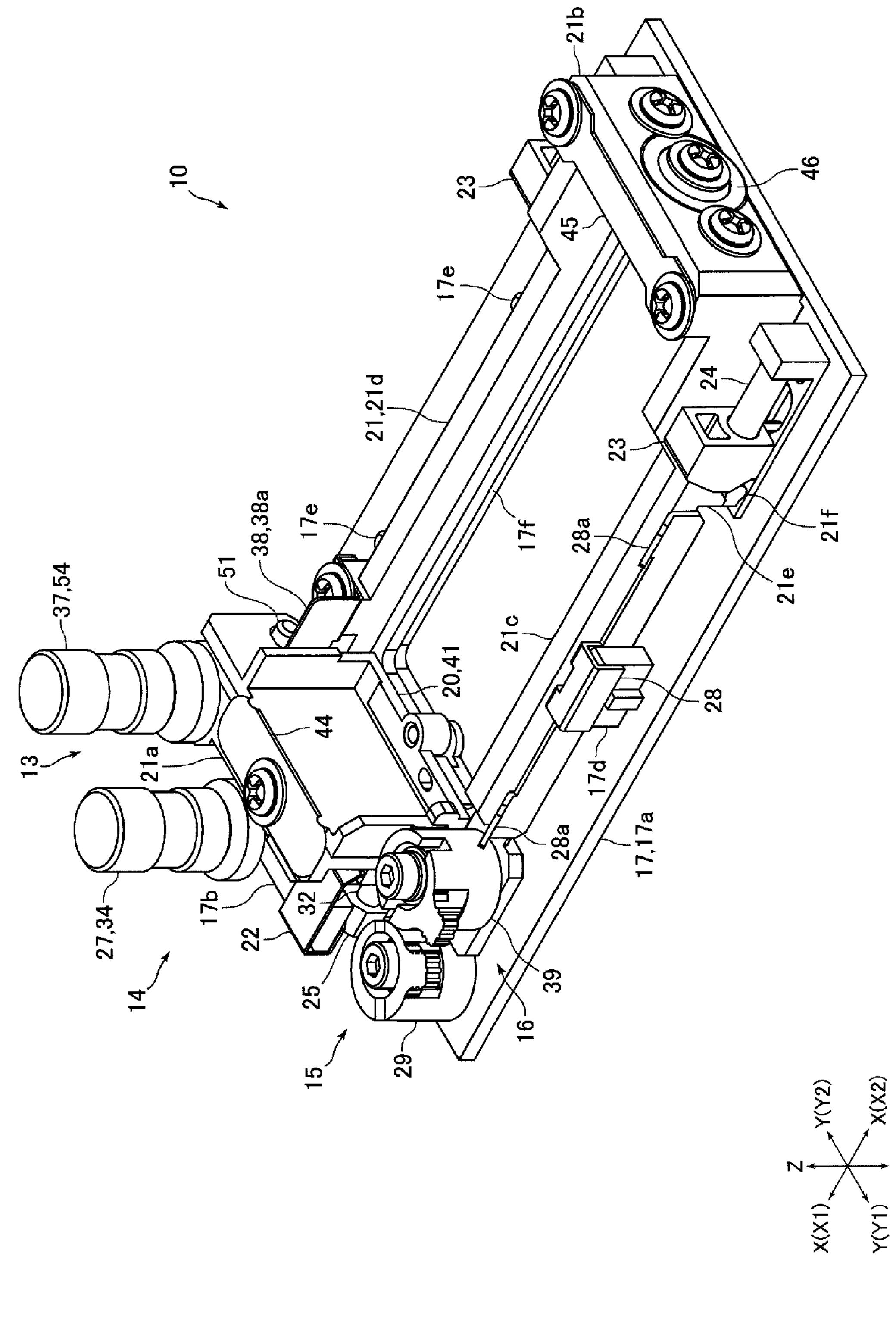
FIG. 7 is a perspective view illustrating the adjustment mechanism illustrated in FIG. 3 from a direction different from those in FIGS. 5 and 6.
Figure 8:
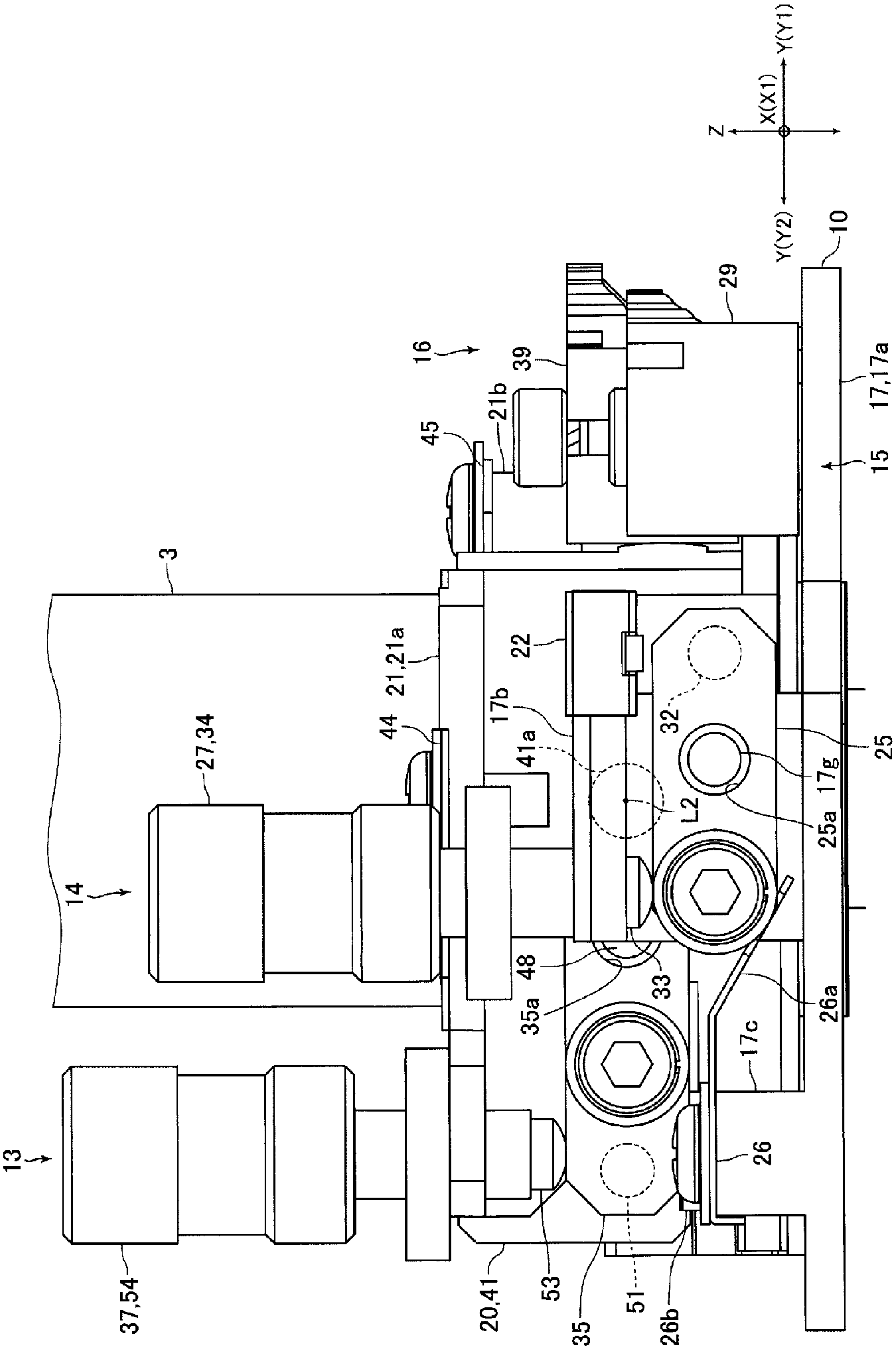
FIG. 8 is a front view of the inkjet head and the adjustment mechanism illustrated in FIG. 3.
Figure 9:
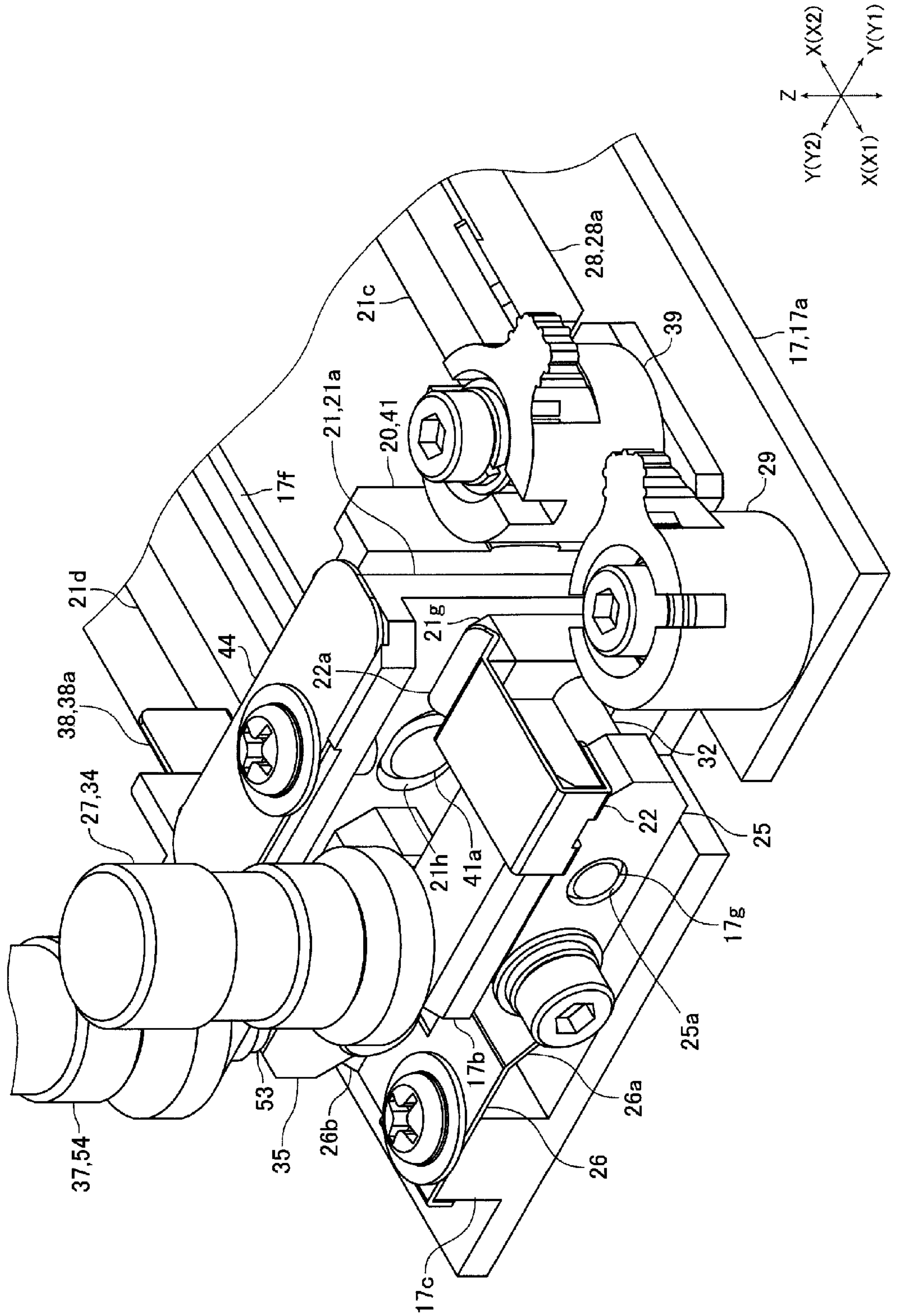
FIG. 9 is an enlarged view of a portion E in FIG. 5.
Figure 10:
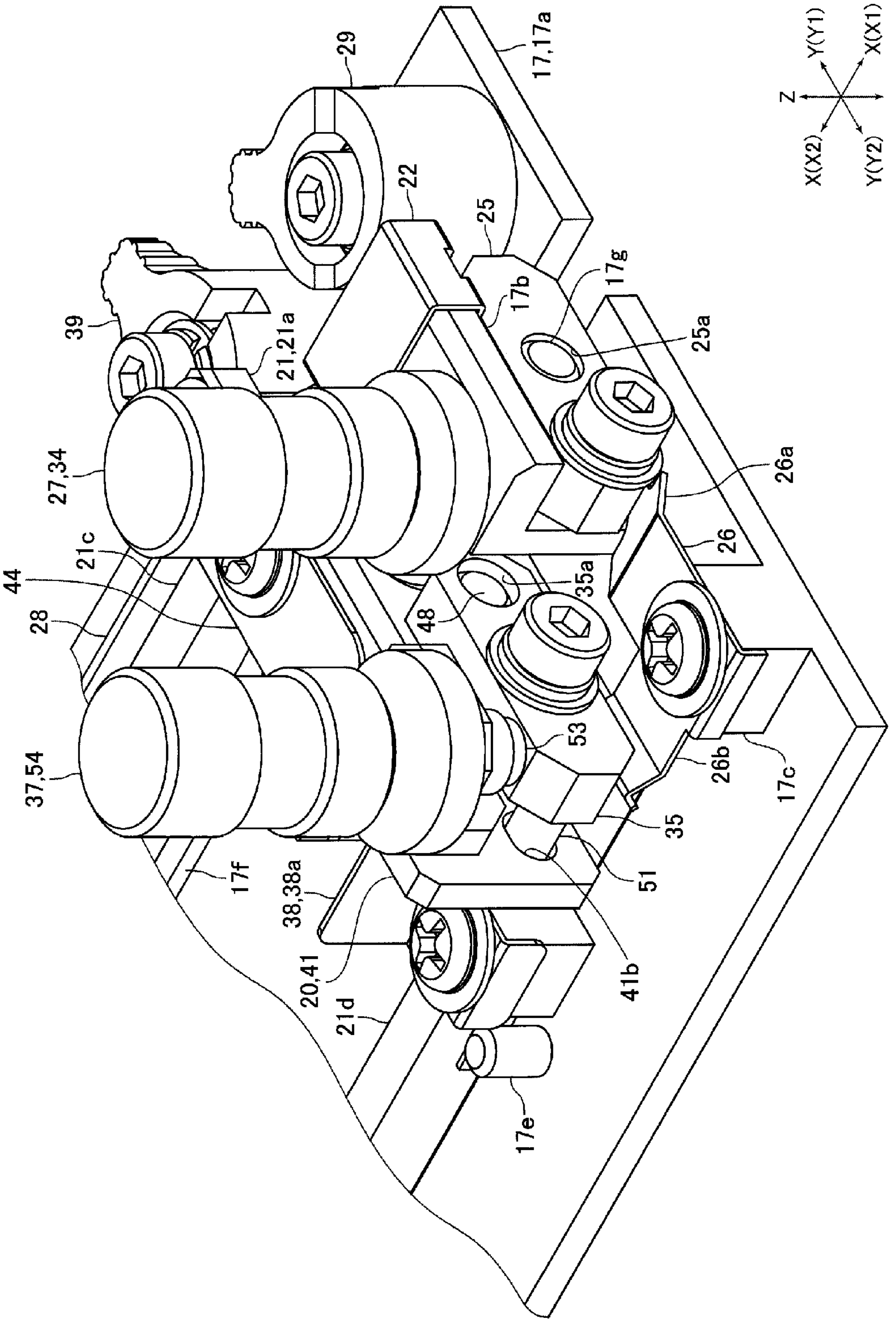
FIG. 10 is an enlarged view of a portion F in FIG. 6.
Figure 11:
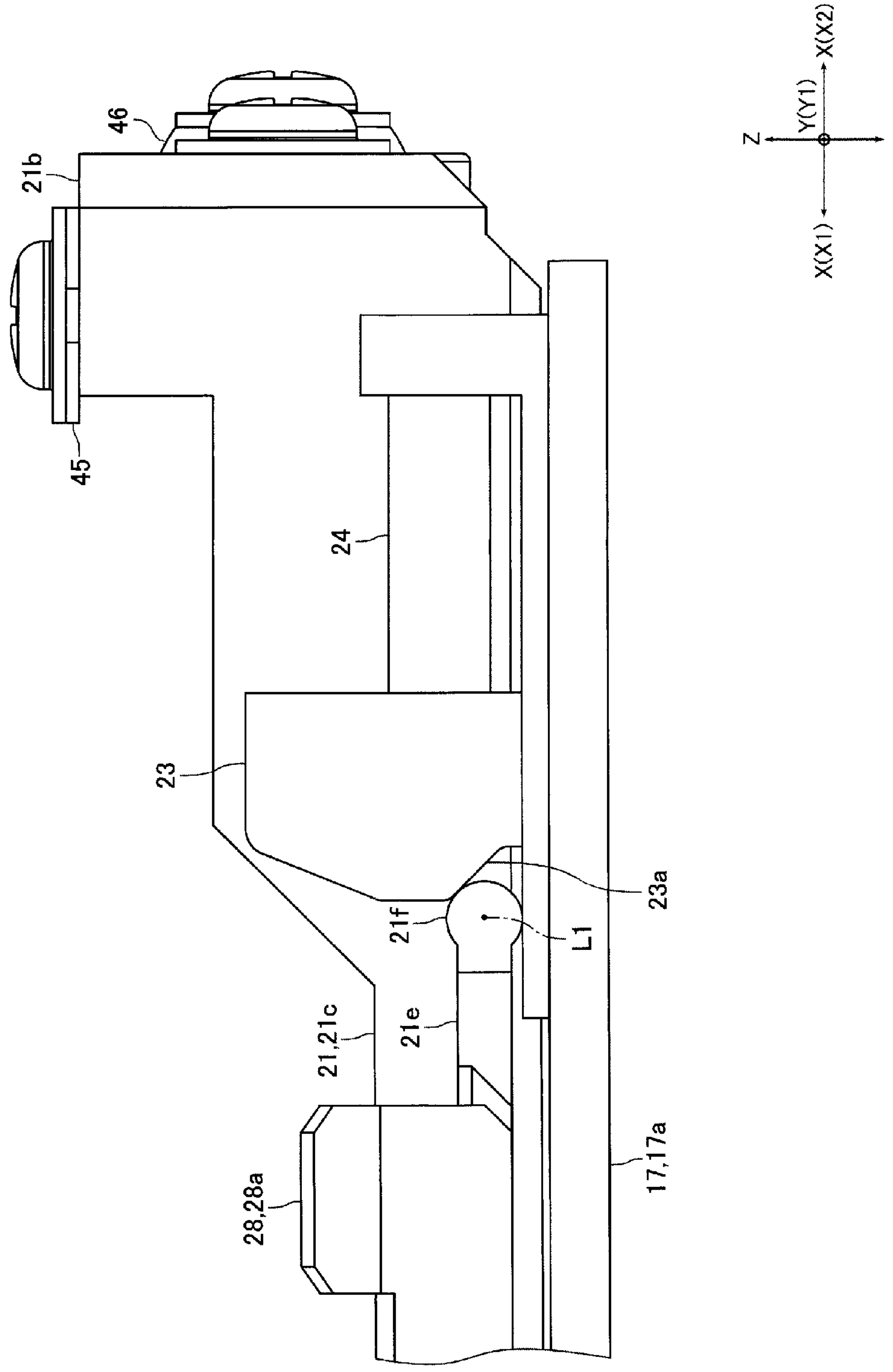
FIG. 11 is an enlarged side view illustrating the adjustment mechanism from the G-G direction in FIG. 5.

FIG. 3 is a perspective view of a head 3 and an adjustment mechanism 10 illustrated in FIG. 2. FIG. 4 is a plan view of an adjustment mechanism 10 illustrated in FIG. 3. FIG. 5 is a perspective view of the adjustment mechanism 10 illustrated in FIG. 3. FIG. 6 is a perspective view illustrating the adjustment mechanism 10 illustrated in FIG. 3 from a direction different from that in FIG. 5. FIG. 7 is a perspective view illustrating the adjustment mechanism 10 illustrated in FIG. 3 from a direction different from those in FIGS. 5 and 6. FIG. 8 is a front view of the head 3 and the adjustment mechanism 10 illustrated in FIG. 3. FIG. 9 is an enlarged view of a portion E in FIG. 5. FIG. 10 is an enlarged view of a portion F in FIG. 6. FIG. 11 is an enlarged side view illustrating the adjustment mechanism 10 from the G-G direction in FIG. 5.

In the following description, the main scanning direction (X direction) is assumed as "left-right direction" and the sub scanning direction (Y direction) is assumed as "front-back direction". Furthermore, the Y1 direction side of FIG. 3 or the like, which is one side in the left-right direction, is defined as the "right" side, the Y2 direction side of FIG. 3 or the like on the opposite side is defined as the "left" side, the X1 direction side of FIG. 3 or the like, which is one side in the front-back direction, is defined as the "front" side, and the X2 direction side of FIG. 3 or the like on the opposite side is defined as the "back" side.

The adjustment mechanism 10 includes a first inclination adjustment mechanism 13 for adjusting the inclination of each of the heads 3 with respect to the carriage 4 in a pivoting direction having the front-back direction (sub scanning direction) as an axial direction of pivoting, and a second inclination adjustment mechanism 14 for adjusting the inclination of each of the heads 3 with respect to the carriage 4 in a pivoting direction having the left-right direction (main scanning direction) as an axial direction of pivoting. The adjustment mechanism 10 includes a position adjustment mechanism 15 for adjusting the position in the front-back direction of each of the heads 3 with respect to the carriage 4, and a third inclination adjustment mechanism 16 for adjusting the inclination of each of the heads 3 with respect to the carriage 4 in a pivoting direction having the up-down direction as an axial direction of pivoting. The adjustment mechanism 10 further includes a base member 17 fixed to the carriage 4.

The first inclination adjustment mechanism 13 includes a head fixing member 20 to which the head 3 is fixed. The second inclination adjustment mechanism 14 includes a holding member 21 that holds the head fixing member 20. The holding member 21 is pivotable with respect to the base member 17 with the left-right direction as an axial direction of pivoting. That is, the holding member 21 is pivotable with respect to the base member 17 fixed to the carriage 4 with the left-right direction as an axial direction of pivoting, and is pivotable with respect to the carriage 4 with the left-right direction as an axial direction of pivoting. The head fixing member 20 is pivotable with respect to the holding member 21 with the front-back direction as an axial direction of pivoting.

The holding member 21 constitutes a part of the position adjustment mechanism 15. The holding member 21 is movable in the front-back direction with respect to the base member 17. That is, the holding member 21 is movable in the front-back direction with respect to the base member 17 fixed to the carriage 4, and is movable in the front-back direction with respect to the carriage 4. The head fixing member 20 constitutes a part of the third inclination adjustment mechanism 16. The head fixing member 20 is pivotable with respect to the holding member 21 with the up-down direction as an axial direction of pivoting.

In addition to the holding member 21, the second inclination adjustment mechanism 14 includes a leaf spring 22 that biases the holding member 21 toward one side in the pivoting direction of the holding member 21 with respect to the base member 17, a fulcrum portion holding member 23 that comes in contact with a fulcrum portion **21*f*, described later, formed on the holding member 21 from the back side, and a compression coil spring 24 that biases the fulcrum portion holding member 23 towards the front side. Furthermore, the second inclination adjustment mechanism 14 includes a second lever member 25 pivotably held by the carriage 4 through the base member 17, a leaf spring 26 for biasing the second lever member 25 toward one side in a pivoting direction of the second lever member 25, and a second micrometer head 27 (hereinafter referred to as "second micrometer head 27") for pivoting the second lever member 25 toward the other side in the pivoting direction of the second lever member 25**.

The fulcrum portion holding member 23 and compression coil spring 24 constitute a part of position adjustment mechanism 15. In addition to the holding member 21, the fulcrum portion holding member 23, and the compression coil spring 24, the position adjustment mechanism 15 includes a leaf spring 28 that biases the holding member 21 toward the left side, and an eccentric cam 29 for adjusting the position in the front-back direction of the holding member 21 with respect to the base member 17.

The base member 17 includes a flat plate-shaped base plate portion 17*a* fixed to the carriage 4, a holding portion 17*b* that holds the second lever member 25 and the second micrometer head 27, a spring fixing portion 17*c* to which the leaf spring 26 is fixed, a spring fixing portion 17*d* to which the leaf spring 28 is fixed, and two regulation pins 17*e* that regulate the position of the holding member 21 in the left-right direction.

The base plate portion 17*a* is formed in a substantially rectangular flat plate shape. The base plate portion 17*a* is fixed to the carriage 4 in a state where the thickness direction of the base plate portion 17*a* formed in a flat plate shape coincides with the up-down direction, and in a state where the long side direction of the base plate portion 17*a* formed in a substantially rectangular shape coincides with the front-back direction. A rectangular opening 17*f* in which the lower end portion of the head 3 is disposed is formed in the base plate portion 17*a*.

The holding portion 17*b*, the spring fixing portion 17*c*, and the spring fixing portion 17*d* are formed in a block shape rising toward the upper side from the upper surface of the base plate portion 17*a*. The holding portion 17*b* and the spring fixing portion 17*c* are formed at the front end portion of the base member 17. In addition, the holding portion 17*b* is formed at a substantially central position of the base member 17 in the left-right direction, and the spring fixing portion 17*c* is formed at a left end portion of the base member 17.

The spring fixing portion 17*d* is formed at the right end portion of the base member 17. Furthermore, the spring fixing portion 17*d* is formed at a substantially central position of the base member 17 in the front-back direction. The two regulation pins 17*e* are formed at the left end portion of the base member 17. The two regulation pins 17*e* are disposed on the back side of the spring fixing portion 17*c*. The two regulation pins 17*e* are disposed at the same position in the left-right direction and are spaced apart from each other in the front-back direction.

The holding member 21 is formed in a substantially rectangular frame shape as a whole. The holding member 21 is placed on the base plate portion 17*a*. The long side direction of the holding member 21 formed in a substantially rectangular frame shape coincides with the front-back direction. The lower end portion of the head 3 is disposed on the inner peripheral side of the holding member 21. The holding member 21 includes a front wall portion 21*a* forming a front surface of the holding member 21, a back wall portion 21*b* forming a rear surface of the holding member 21, a side wall portion 21*c* connecting the front wall portion 21*a* and the back wall portion 21*b* on a right side of the holding member 21, and a side wall portion 21*d* connecting the front wall portion 21*a* and the back wall portion 21*b* on a left side of the holding member 21. The front wall portion 21*a* is disposed on the back side of the holding portion 17*b* of the base member 17.

A protrusion 21*e* protruding toward the right side is formed on the side wall portion 21*c*, and a protrusion 21*e* protruding toward the left side is formed on the side wall portion 21*d*. The protrusion 21*e* is disposed on the back side of the spring fixing portion 17*d*. A rear end portion of the protrusion 21*e* is a fulcrum portion 21*f* formed in a substantially columnar shape. The fulcrum portion 21*f* formed in a substantially columnar shape is disposed in a state where the axial direction of the fulcrum portion 21*f* coincides with the left-right direction. The fulcrum portion 21*f* formed on the side wall portion 21*c* and the fulcrum portion 21*f* formed on side wall portion 21*d* are disposed at the same position in the front-back direction. The two fulcrum portions 21*f* serve as fulcrums for the pivoting of the holding member 21 with respect to the carriage 4, and the holding member 21 is pivotable with respect to the carriage 4 with an axis line L1 passing through the axial centers of the two fulcrum portions 21*f* as a center of pivoting.

The fulcrum portion holding member 23 is formed in a substantially rectangular parallelepiped block shape. The compression coil spring 24 is disposed on the back side of the fulcrum portion holding member 23 and biases the fulcrum portion holding member 23 towards the front side as described above. The fulcrum portion holding member 23 is linearly movable in the front-back direction with respect to the base member 17. The fulcrum portion holding member 23 and the compression coil spring 24 are disposed at two locations of a right side of the side wall portion 21*c* and a left side of the side wall portion 21*d*.

An inclined surface 23*a* with which the fulcrum portion 21*f* comes into contact is formed at the lower end portion of the front surface of the fulcrum portion holding member 23 (see FIG. 11). The inclined surface 23*a* is inclined upward toward the front side. The fulcrum portion 21*f* is restricted from moving upward and moving backward by the inclined surface 23*a*. That is, the holding member 21 is restricted from moving upward and moving backward by the fulcrum portion holding member 23. The compression coil spring 24 biases the holding member 21 towards the front side through the fulcrum portion holding member 23.

The leaf spring 22 is attached to the holding portion 17*b* of the base member 17. As illustrated in FIG. 9, the front wall portion 21*a* of the holding member 21 is formed with protrusion 21*g* protruding toward the front side, and spring portion 22*a* of the leaf spring 22 is in contact with an upper surface of the protrusion 21*g*. That is, the leaf spring 22 biases the front end portion of the holding member 21 downward.

The second lever member 25 is formed in a substantially rectangular parallelepiped shape elongated in the left-right direction. A round hole-shaped insertion hole 25*a* penetrating in the front-back direction is formed in a central portion of the second lever member 25 (see FIGS. 8 to 10). A columnar fixed shaft 17*g* formed in the holding portion 17*b* is inserted into the insertion hole 25*a*, and a central portion of the second lever member 25 is pivotably supported by the fixed shaft 17*g*. Therefore, the second lever member 25 is pivotable with respect to the base member 17 with the front-back direction as an axial direction of pivoting. At a right end portion of the second lever member 25, an engagement pin 32 is formed or fixed in a columnar shape protruding toward the back side (see FIG. 9). The back end portion of the engagement pin 32 is inserted into an engagement hole formed in the protrusion 21*g* of the holding member 21.

The leaf spring 26 is fixed to the spring fixing portion 17*c*. The leaf spring 26 includes a second spring portion 26*a* that comes into contact with the left end portion of the second lever member 25 from the lower side (see FIGS. 8 and 10). The second spring portion 26*a* biases the left end portion of the second lever member 25 toward the upper side. The second spring portion 26*a* of the present embodiment is a second spring member that biases the second lever member 25 toward one side in the pivoting direction of the second lever member 25. The leaf spring 26 also constitutes a part of the first inclination adjustment mechanism 13.

The second micrometer head 27 is attached to the holding portion 17*b*. Specifically, the second micrometer head 27 is attached to the holding portion 17*b* such that the spindle 33 of the second micrometer head 27 is disposed on the lower side (see FIG. 8). The lower end of the spindle 33 is in contact with the upper surface of the left end portion of the second lever member 25.

When the operator of the printer 1 turns the thimble (knob) 34 of the second micrometer head 27, the spindle 33 moves up and down. When the spindle 33 moves up and down, the second lever member 25 pivots about the fixed shaft 17*g*. When the second lever member 25 pivots, the engagement pin 32 moves up and down together with the right end portion of the second lever member 25, so that the front end portion of the holding member 21 moves up and down. When the front end portion of the holding member 21 moves up and down, the holding member 21 pivots about the axis line L1. That is, the second lever member 25 is engaged with the holding member 21 through the engagement pin 32, and when the second lever member 25 is pivoted, the holding member 21 pivots with respect to the carriage 4 with the left-right direction as an axial direction of pivoting.

The leaf spring 28 is fixed to the spring fixing portion 17*d*, as described above. The leaf spring 28 is formed with a spring portion 28*a* that comes into contact with the holding member 21. The spring portion 28*a* is in contact with the holding member 21 from the right side, and biases the holding member 21 toward the left side. The left surface of the side wall portion 21*d* of the holding member 21 biased to the left side is in contact with the two regulation pins 17*e*.

The eccentric cam 29 is pivotably attached to a right front end portion of the base plate portion 17*a*. The eccentric cam 29 is pivotable with the up-down direction as an axial direction of pivoting. The cam surface of the eccentric cam 29 is in contact with the right end portion of the front surface of the front wall portion 21*a* of the holding member 21. When the operator of the printer 1 pivots the eccentric cam 29, the holding member 21 linearly moves in the front-back direction along the two regulation pins 17*e*. That is, when the eccentric cam 29 is pivoted, the holding member 21 linearly moves in the front-back direction with respect to the carriage 4. The fulcrum portion holding member 23 linearly moves in the front-back direction according to the movement of the holding member 21.

As described above, the leaf spring 26 constitutes a part of the first inclination adjustment mechanism 13. The first inclination adjustment mechanism 13 includes a first lever member 35 pivotably held by the holding member 21 in addition to the head fixing member 20 and the leaf spring 26. A first spring portion 26*b* described later forming a part of the leaf spring 26 biases the first lever member 35 toward one side in the pivoting direction of the first lever member 35. In addition, the first inclination adjustment mechanism 13 includes a first micrometer head 37 (hereinafter referred to as "first micrometer head 37") for pivoting the first lever member 35 toward the other side in the pivoting direction of the first lever member 35.

As described above, the head fixing member 20 constitutes a part of the third inclination adjustment mechanism 16. The third inclination adjustment mechanism 16 includes, in addition to the head fixing member 20, a leaf spring 38 that biases the head fixing member 20 toward one side in a pivoting direction of the head fixing member 20 having the up-down direction as an axial direction of pivoting, and an eccentric cam 39 for adjusting the inclination of the head fixing member 20 with respect to the holding member 21 in the pivoting direction having the up-down direction as the axial direction of pivoting.

The head fixing member 20 includes two members, that is, a first fixing member 41 to which the front end portion of the head 3 is fixed and a second fixing member 42 to which the back end portion of the head 3 is fixed. The first fixing member 41 and the second fixing member 42 are integrated by way of the head 3. A placement portion on which the first fixing member 41 is placed is formed on the back side of the front wall portion 21*a* of the holding member 21, and the first fixing member 41 is placed on the placement portion. A placement portion on which the second fixing member 42 is placed is formed on the front side of the back wall portion 21*b* of the holding member 21, and the second fixing member 42 is placed on the placement portion.

The first fixing member 41 is formed with a columnar fixed shaft 41*a* protruding toward the front side. An insertion hole 21*h* into which the fixed shaft 41*a* is inserted is formed in the front wall portion 21*a* (see FIG. 9). The insertion hole 21*h* is formed in a long hole shape with the left-right direction as the longitudinal direction. The fixed shaft 41*a* is pivotably held by the front wall portion 21*a*. A leaf spring 44 is fixed to an upper end face of the front wall portion 21*a*. The leaf spring 44 is in contact with the upper end face of the first fixing member 41 and biases the first fixing member 41 downward. Furthermore, a leaf spring 45 is fixed to an upper end face of the back wall portion 21*b*. The leaf spring 45 is in contact with the upper end face of the second fixing member 42 and biases the second fixing member 42 downward.

On the back surface of the second fixing member 42, a to-be-supporting portion (not illustrated) protruding toward the back side is formed. The to-be-supporting portion is formed in, for example, a hemispherical shape, and is supported by a spherical bearing (spherical slide bearing) 46 fixed to the back wall portion 21*b*. The back end of the to-be-supporting portion formed in a hemispherical shape and the fixed shaft 41*a* are disposed at substantially the same position in the left-right direction. In a pivoting direction of the head fixing member 20 having the front-back direction as an axial direction of pivoting, the fixed shaft 41*a* and the to-be-supporting portion serve as a fulcrum of pivoting of the head fixing member 20 with respect to the holding member 21, and the head fixing member 20 is pivotable with respect to the holding member 21 with an axis line L2 passing through an axial center of the fixed shaft 41*a* and a back end of the to-be-supporting portion as a center of pivoting. That is, the head fixing member 20 is pivotable with respect to the carriage 4 with the axis line L2 as the center of pivoting.

The to-be-supporting portion of the second fixing member 42 supported by the spherical bearing 46 serves as a fulcrum of pivoting of the head fixing member 20 with respect to the holding member 21 in a pivoting direction of the head fixing member 20 having the up-down direction as an axial direction of pivoting, and the head fixing member 20 is pivotable with respect to the holding member 21 with the to-be-supporting portion of the second fixing member 42 as a center of pivoting and with the up-down direction as an axial direction of pivoting. That is, the head fixing member 20 is pivotable with respect to the carriage 4 with the to-be-supporting portion of the second fixing member 42 as the center of pivoting. Notches for preventing interference between the head fixing member 20 and the holding member 21 when the head fixing member 20 is pivoted with respect to the holding member 21 are formed in at least one of the head fixing member 20 and the holding member 21.

The leaf spring 38 is attached to the front end portion of the side wall portion 21*d* of the holding member 21. A spring portion 38*a* of leaf spring 38 is in contact with the first fixing member 41 from the left side, and biases the first fixing member 41 to the right side. The eccentric cam 39 is pivotably attached to a right front end portion of the holding member 21. The eccentric cam 39 is pivotable with the up-down direction as an axial direction of pivoting. The cam surface of the eccentric cam 39 is in contact with the left side surface of the first fixing member 41. When the operator of the printer 1 pivots the eccentric cam 39, the head fixing member 20 pivots with respect to the holding member 21 about the to-be-supporting portion of the second fixing member 42.

The first lever member 35 is formed in a substantially rectangular parallelepiped shape elongated in the left-right direction. As illustrated in FIG. 10, a round hole-shaped insertion hole 35*a* penetrating in the front-Back direction is formed at the right end portion of the first lever member 35. A fixed shaft 48 formed or fixed on the front wall portion 21*a* is inserted into the insertion hole 35*a*, and a right end portion of the first lever member 35 is pivotably supported by the fixed shaft 48. Therefore, the first lever member 35 is pivotable with respect to the holding member 21 with the front-back direction as an axial direction of pivoting.

As illustrated in FIG. 10, an engagement pin 51 is formed or fixed in a columnar shape protruding toward the back side on a left end portion of the first lever member 35. The back end portion of the engagement pin 51 is inserted into an engagement hole 41*b* formed at the left end portion of the first fixing member 41. The engagement hole 41*b* penetrates the first fixing member 41 in the front-back direction. Furthermore, the engagement hole 41*b* is formed in a long hole shape with the left-right direction as the longitudinal direction.

The leaf spring 26 includes a first spring portion 26*b* that comes into contact with the left end portion of the first lever member 35 from the lower side. The first spring portion 26*b* biases the left end portion of the first lever member 35 toward the upper side. The first spring portion 26*b* of the present embodiment is a first spring member that biases the first lever member 35 toward one side in the pivoting direction of the first lever member 35.

The first micrometer head 37 is attached to the left end portion of the front wall portion 21*a*. Specifically, the first micrometer head 37 is attached to the left end portion of the front wall portion 21*a* such that the spindle 53 of the first micrometer head 37 is disposed on the lower side (see FIG. 8). The lower end of the spindle 53 is in contact with the upper surface of the left end portion of the first lever member 35.

When the operator of the printer 1 turns the thimble 54 of the first micrometer head 37, the spindle 53 moves up and down. When the spindle 53 moves up and down, the first lever member 35 pivots about the fixed shaft 48. When the first lever member 35 is pivoted, the engagement pin 51 moves up and down together with the left end portion of the first lever member 35, so that the left end portion of the first lever member 35 moves up and down, and the first fixing member 41 pivots. That is, when the first lever member 35 is pivoted, the head fixing member 20 pivots about the axis line L2. As described above, the first lever member 35 is engaged with the head fixing member 20 through the engagement pin 51, and when the first lever member 35 is pivoted, the head fixing member 20 pivots with respect to the carriage 4 with the front-back direction as an axial direction of pivoting.

Main Effect of Present Embodiment

As described above, in the present embodiment, when the thimble 54 of the first micrometer head 37 is pivoted, the head fixing member 20 pivots with respect to the carriage 4 with the front-rear direction as an axial direction of pivoting. Therefore, in the present embodiment, the inclination of each of the heads 3 with respect to the carriage 4 can be adjusted in the pivoting direction having the front-back direction as the axial direction of pivoting by pivoting the thimble 54. Therefore, in the present embodiment, variations in the inclination of the two heads 3 mounted on the carriage 4 in the pivoting direction having the front-back direction as the axial direction of pivoting for each head 3 can be suppressed.

In addition, in the present embodiment, when the thimble 34 of the second micrometer head 27 is pivoted, the holding member 21 pivots with respect to the carriage 4 with the left-right direction as an axial direction of pivoting. Therefore, in the present embodiment, the inclination of each of the heads 3 with respect to the carriage 4 in the pivoting direction having the left-right direction as the axial direction of pivoting can be adjusted by pivoting the thimble 34. Therefore, in the present embodiment, variations in the inclination of the two heads 3 mounted on the carriage 4 in the pivoting direction having the left-right direction as the axial direction of pivoting for each head 3 can be suppressed.

As described above, in the present embodiment, variations in the inclination of the two heads 3 mounted on the carriage 4 in the pivoting direction having the front-back direction as the axial direction of the pivoting for each head 3, and variations in the inclination of the two heads 3 mounted on the carriage 4 in the pivoting direction having the left-right direction as the axial direction of the pivoting for each head 3 can be suppressed. Therefore, in the present embodiment, variations in the landing position of the ink ejected from the two heads 3 mounted on the carriage 4 on the print medium 2 for each head 3 can be suppressed.

Furthermore, in the present embodiment, variations in the inclination of the two heads 3 mounted on the carriage 4 in the pivoting direction having the front-back direction as the axial direction of pivoting for each head 3 and variations in the inclination of the two heads 3 mounted on the carriage 4 in the pivoting direction having the left-right direction as the axial direction of pivoting for each head 3 can be suppressed, whereby even if the thickness of the print medium 2 is changed, and even if the surface of the print medium 2 has irregularities, variations in the landing position of the ink ejected from the two heads 3 mounted on the carriage 4 on the print medium 2 for each head 3 can be suppressed.

In the present embodiment, the holding member 21 forming a part of the second inclination adjustment mechanism 14 constitutes a part of the position adjustment mechanism 15, and the holding member 21 is movable in the front-back direction with respect to the carriage 4. Furthermore, in the present embodiment, the head fixing member 20 forming a part of the first inclination adjustment mechanism 13 constitutes a part of the third inclination adjustment mechanism 16, and the head fixing member 20 can pivot with respect to the holding member 21 with the up-down direction as the axial direction pivoting. Therefore, in the present embodiment, even if the adjustment mechanism 10 includes the position adjustment mechanism 15 and the third inclination adjustment mechanism 16 in addition to the first inclination adjustment mechanism 13 and the second inclination adjustment mechanism 14, the configuration of the printer 1 can be simplified.

Other Embodiments

The above-described embodiment is an example of a preferred embodiment of the present invention, but the present invention is not limited thereto, and various modifications can be made without changing the gist of the present invention.

In the embodiment described above, the first inclination adjustment mechanism 13 may include, instead of the first micrometer head 37, a first adjustment screw for pivoting the first lever member 35 to the other side in the pivoting direction of the first lever member 35. In this case, the first adjustment screw is attached to the left end portion of the front wall portion 21*a*, and the lower end of the first adjustment screw is in contact with the upper surface of the left end portion of the first lever member 35. The front wall portion 21*a* is formed with a screw hole into which the first adjustment screw is screwed.

In the embodiment described above, the second inclination adjustment mechanism 14 may include, instead of the second micrometer head 27, a second adjustment screw for pivoting the second lever member 25 to the other side in the pivoting direction of the second lever member 25. In this case, the second adjustment screw is attached to the holding portion 17*b*, and the lower end of the second adjustment screw is in contact with the upper surface of the left end portion of the second lever member 25. The holding portion 17*b* is formed with a screw hole into which the second adjustment screw is screwed.

In the embodiment described above, the adjustment mechanism 10 may not include the second inclination adjustment mechanism 14. Even in this case, the first inclination adjustment mechanism 13 can suppress the variation in the inclination of the two heads 3 mounted on the carriage 4 in the pivoting direction having the front-back direction as the axial direction of pivoting for each head 3, so that the variation in the landing position of the ink ejected from the two heads 3 mounted on the carriage 4 on the print medium 2 for each head 3 can be suppressed.

In the embodiment described above, the adjustment mechanism 10 may not include the first inclination adjustment mechanism 13. Even in this case, the second inclination adjustment mechanism 14 can suppress the variation in the inclination of the two heads 3 mounted on the carriage 4 in the pivoting direction having the left-right direction as the axial direction of pivoting for each head 3, so that the variation in the landing position of the ink ejected from the two heads 3 mounted on the carriage 4 on the print medium 2 for each head 3 can be suppressed.

According to the study of the inventors of the present application, it is possible to suppress the variation of the landing position of the ink ejected from the two heads 3 mounted on the carriage 4 on the print medium 2 for each head 3 by suppressing the variation of the inclination of the two heads 3 mounted on the carriage 4 in the pivoting direction having the front-back direction as the axial direction of pivoting for each head 3 rather than suppressing the variation of the inclination of the two heads 3 mounted on the carriage 4 in the pivoting direction having the left-right direction as the axial direction of pivoting for each head 3, and hence the adjustment mechanism 10 preferably includes the first inclination adjustment mechanism 13.

In the embodiment described above, the holding member 21 may be pivotable with the front-back direction as the axial direction of pivoting with respect to the carriage 4, and the head fixing member 20 may be pivotable with the left-right direction as the axial direction of pivoting with respect to the holding member 21. Furthermore, in the embodiment described above, the holding member 21 may not constitute a part of the position adjustment mechanism 15. The head fixing member 20 may not constitute a part of the third inclination adjustment mechanism 16. Furthermore, in the embodiment described above, the adjustment mechanism 10 may not include the position adjustment mechanism 15 or may not include the third inclination adjustment mechanism 16.

In the embodiment described above, the number of heads 3 mounted on the carriage 4 may be three or more. In this case, the printer 1 includes the adjustment mechanism 10 of a number corresponding to the number of heads 3 mounted on the carriage 4. In the embodiment described above, instead of the platen 7 and the medium feeding mechanism 8, the printer 1 may include a table on which the print medium 2 is placed and a table feeding mechanism that feeds the table in the sub scanning direction (front-back direction), or may include a table on which the print medium 2 is placed and a Y bar feeding mechanism that feeds a Y bar to which the guide rail 6 is fixed in the sub scanning direction (front-back direction). In addition, in the embodiment described above, the printer 1 may be a 3D printer.

The invention claimed is:

1. An inkjet printer including:

a plurality of inkjet heads that eject ink;

a carriage on which the plurality of inkjet heads are mounted;

a carriage drive mechanism that moves the carriage in a main scanning direction;

a first inclination adjustment mechanism for adjusting inclination of each of the inkjet heads with respect to the carriage in a pivoting direction having a sub scanning direction orthogonal to an up-down direction and the main scanning direction as an axial direction of pivoting; and a second inclination adjustment mechanism for adjusting inclination of each of the inkjet heads with respect to the carriage in a pivoting direction having the main scanning direction as an axial direction of pivoting, wherein the first inclination adjustment mechanism includes a head fixing member to which the inkjet head is fixed;

the second inclination adjustment mechanism includes a holding member that holds the head fixing member;

the holding member is pivotable with respect to the carriage with a main scanning direction as an axial direction of pivoting; and the head fixing member is pivotable with respect to the holding member with a sub scanning direction as an axial direction of pivoting, wherein the first inclination adjustment mechanism includes a first lever member pivotably held by the holding member, a first spring member that biases the first lever member toward one side in a pivoting direction of the first lever member, and a first micrometer head or a first adjustment screw for pivoting the first lever member toward the other side in the pivoting direction of the first lever member;

the second inclination adjustment mechanism includes a second lever member pivotably held by the carriage, a second spring member that biases the second lever member toward one side in a pivoting direction of the second lever member, and a second micrometer head or a second adjustment screw for pivoting the second lever member toward the other side in the pivoting direction of the second lever member;

the first lever member is engaged with the head fixing member, and when the first lever member is pivoted, the head fixing member is pivoted with a sub scanning direction as an axial direction of pivoting with respect to the holding member; and the second lever member is engaged with the holding member, and when the second lever member is pivoted, the holding member is pivoted with a main scanning direction as an axial direction of pivoting with respect to the carriage.

2. The inkjet printer as set forth in claim 1, further comprising a position adjustment mechanism for adjusting a position in a sub scanning direction of each of the inkjet heads with respect to the carriage, and a third inclination adjustment mechanism for adjusting an inclination of each of the inkjet heads with respect to the carriage in a pivoting direction having an up-down direction as an axial direction of pivoting; wherein the holding member constitutes a part of the position adjustment mechanism and is movable in the sub scanning direction with respect to the carriage; and the head fixing member constitutes a part of the third inclination adjustment mechanism, and is pivotable with respect to the holding member with an up-down direction as an axial direction of pivoting.

* * * * *